United States Patent [19]

Walk et al.

[11] 4,453,767

[45] Jun. 12, 1984

[54] HINGE, PARTICULARLY FOR SEATS WITH ADJUSTABLE BACKS

[75] Inventors: Hansjörg Walk, Reutlingen; Wilhelm Wingensiefen, Odenthal, both of Fed. Rep. of Germany

[73] Assignee: Keiper Automobiltechnik GmbH & Co. KG, Remschied-Hasten, Fed. Rep. of Germany

[21] Appl. No.: 298,755

[22] Filed: Sep. 2, 1981

[30] Foreign Application Priority Data

Sep. 20, 1980 [EP] European Pat. Off. ............ 80105654

[51] Int. Cl.³ .............................................. B60N 1/02
[52] U.S. Cl. ...................................... 297/362; 74/804; 16/236
[58] Field of Search ................... 297/362; 74/804, 805

[56] References Cited

FOREIGN PATENT DOCUMENTS

| 2028723 | 12/1971 | Fed. Rep. of Germany | 297/362 |
| 2326223 | 12/1974 | Fed. Rep. of Germany | 297/362 |
| 1086102 | 2/1955 | France | 74/804 |

*Primary Examiner*—William E. Lyddane
*Assistant Examiner*—Mark W. Binder
*Attorney, Agent, or Firm*—Michael J. Striker

[57] ABSTRACT

A hinge, particularly for a seat with an adjustable back, has two hinge parts movable relative to one another about a pivot axis between a plurality of relative positions, a rotatable shaft member defining the pivot axis, and an adjusting device for adjusting the relative position between the hinge part and formed as a transmission, wherein the adjusting device includes an eccentric with an inclined surface and a bearing with an adjusting surface on which the surface of the eccentric abuts. The shaft member together with the eccentric is displacement in an axial direction with the aid of an accumulator for obtaining a radial displacement between the hinge parts. The eccentric is formed as a truncated cone, whereas the bearing has a conical bore with an inclination corresponding to the inclination of the truncated cone of the eccentric and a somewhat greater diameter than the latter, and wherein this inclination has an angle which is smaller than the static friction angle and greater than the sliding friction angle of the bearing pair formed by the truncated cone of the eccentric and the conical opening of the bearing.

5 Claims, 6 Drawing Figures

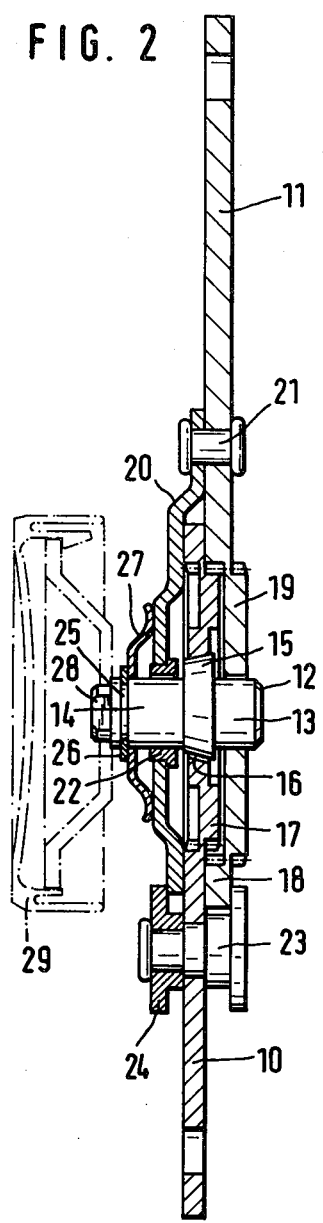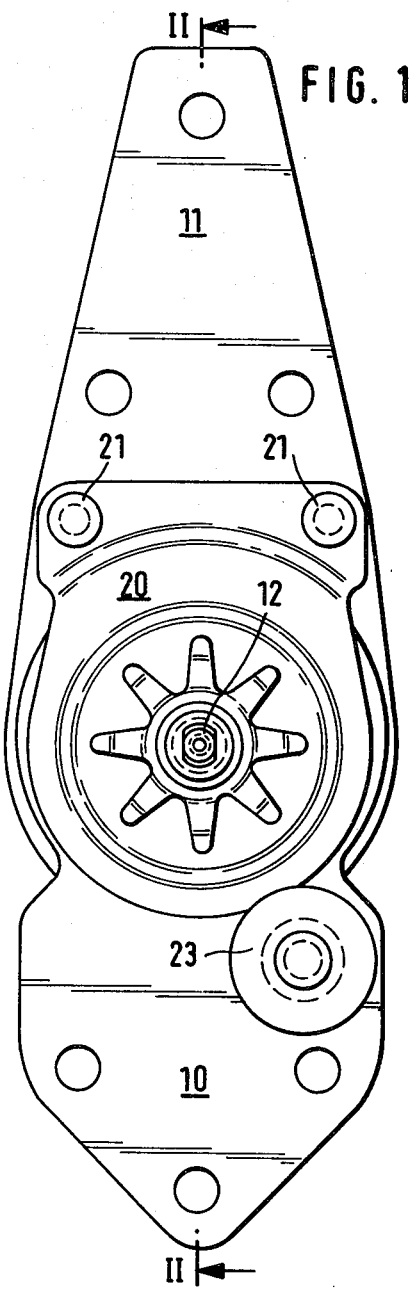

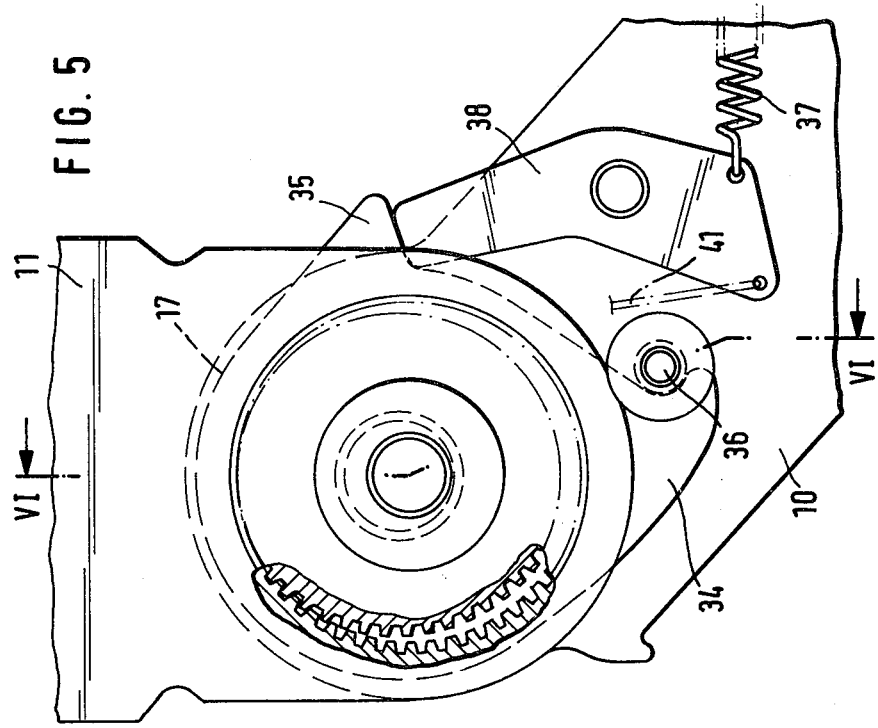
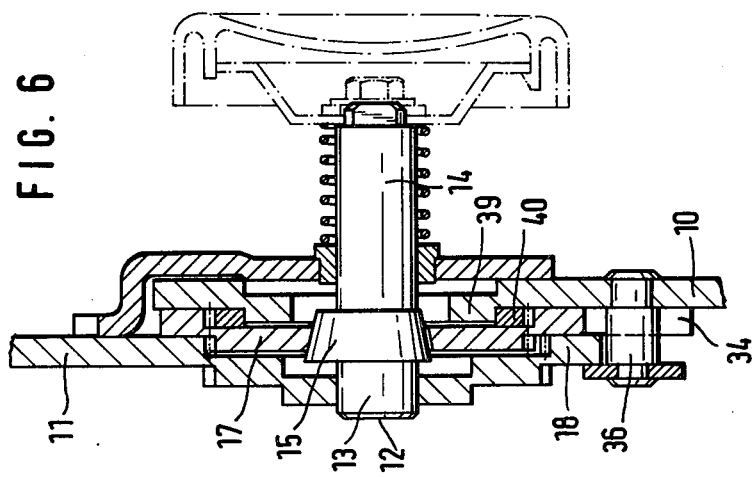

HINGE, PARTICULARLY FOR SEATS WITH ADJUSTABLE BACKS

BACKGROUND OF THE INVENTION

The present invention relates to a hinge, particularly for seats with adjustable backs.

Hinges of this general type are known in the art. A known hinge includes two hinge parts which are connected with one another by a shaft member defining their pivot axis, wherein the position of both hinge parts is determined by a transmission forming a device for adjusting an fixing the hinge parts relative to one another. In the known hinge, this device includes an eccentric having an inclined surface and arranged on the shaft member for joint rotation therewith, and a bearing associated with a gear supported on the eccentric and having an adjusting surface on which the surface of the eccentric abuts. The shaft member together with the eccentric is axially displaceable with the aid of an accumulator for obtaining a radial displacement between two hinge parts. Such a hinge is disclosed, for example in the German Auslegeschrift No. 2,326,223. One of the hinge parts in this hinge is connected with a seat member, whereas the other of the hinge parts is connected with the back member. The hinge part connected with the seat member is connected for joint rotation with a spur gear engaging with an inner gear which, in turn is connected for joint rotation with the hinge part of the back member. The hinge part of the back member is supported on a central portion of the shaft member. The latter has an eccentric portion which supports the spur gear with interposition of a bush. The eccentric portion of the shaft member has in the region of its greater eccentricity a wedge-shaped adjusting surface which is adjacent to the guide surface extending normal thereto. The eccentric portion is surrounded by a ring which has in its interior lateral guiding surfaces extending to the eccentric portion and an inner wedge-shaped adjusting surface. An accumulator is fixed in axial direction on the central portion of the shaft member and loads the eccentric portion so that the toothing of the spur gear and the inner toothed rim are pressed into one another. Thereby the play of toothing, on the one hand, and the bearing play between the shaft member and the hinge parts, on the other hand, is eliminated. In this position the turning of the hinge parts is very difficult inasmuch as the friction force is considerably increased because of the biasing. For this reason an eccentric disk device is arranged between the central portion of the shaft member and the adjusting handle arranged thereon. With this device for beginning the adjusting movement on the turning handle, the shaft member is displaced against the action of the accumulator in axial direction in the releasing sense. Thereby, the active eccentricity of the eccentric bush surrounding the eccentric portion is reduced to such an extent that an easy adjustment of the spur gear in the tooth play guaranteed in the inner gear is performed. After the adjustment step, the adjusting handle is insignificantly rotated back in order to return the cam disk device into its initial position, so that the accumulator returns the shaft member with the eccentric portion into a tensioned position eliminating radial play. In the known hinge it is possible to eliminate the radial play in the case of fixation. However, the required axial displacement of the shaft member is performed by the additional means formed as the cam disk device. Moreover, the tensioned position is not attained automatically by pure releasing of the adjusting handle. Instead, the operator, after termination of the adjustment movement proper, must rotate back the adjustment handle by movement corresponding to the initial adjustment movement in order to compensate for the radial play in the fixation case.

SUMMARY OF THE INVENTION

Accordingly, it is an object of the present invention to provide a hinge, particularly for a seat with an adjustable back, which avoids the disadvantages of the prior art.

More particularly, it is an object of the present invention to provide a hinge, particularly for a seat with an adjustable back, in which the eccentricity of the eccentric can be changed for easy adjustment during the adjusting movement, on the one hand, and for elimination of radial play of the hinge during its fixation position, on the other hand, and so that it is not necessary for the user to perform a special adjustment movement in the shaft member for elimination of the radial play.

In keeping with these objects and with others which will become apparent hereinafter, one feature of the present invention resides, briefly stated, in a hinge, particularly for a seat with an adjustable back, in which the eccentric is formed as a truncated cone, and the bearing has a conical bore with an inclination corresponding to the inclination of the truncated cone of the eccentric and has a somewhat greater diameter than the latter, and wherein the inclination has an angle which is smaller than the static friction angle and greater than the sliding friction angle of a bearing pair including the truncated cone of the eccentric and the conical opening of the bearing.

In other words, the highly advantageous result obtainable from the invention is provided by the fact that by overcoming of the static friction in the adjusting case the sliding friction is effective which during adjustment of the eccentric together with the pulling-back force of the accumulator is smaller than the axial force resulting from the radial forces, wherein the eccentric is axially displaceable in the sense of a radial play. This axial action is reversed during interruption or termination of the adjustment movement, inasmuch as the static friction force is then greater, and together with the spring force overcomes the axial force resulting from the radial force, so that the eccentric portion is displaced back in the sense of elimination of the radial play. Because of the axial movement of the eccentric portion of the shaft member, a compensation of the unavoidable manufacturing tolerances is possible. Thereby means for maintaining play for easier adjustment can be dispensed with, inasmuch as this play is automatically adjusted during the adjustment. During actuation of the hinge it is not necessary for the user to pay special attention to the compensation of the radial play after the termination of the adjustment movement, inasmuch as the radial play is also automatically eliminated after termination of the adjustment movement.

In accordance with another advantageous feature of the present invention, a stable position between the spur gear and the inner gear is attained in an adjusting position of the hinge by a smaller curvature of the conical outer face of the eccentric in the region of its greater eccentricity than in a remaining region. As a result of this, there is obtained a reliable three-point support of the shaft member at two locations of the conical surface and a supporting point located therebetween, of the central portion of the shaft member supported in the other hinge part.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a lateral view of a hinge for utilization between a seat and a back of a power-vehicle seat assembly with a removed handle;

FIG. 2 is a view showing a longitudinal section of the hinge taken along the line 2—2 in FIG. 1;

FIG. 5 is a view substantially corresponding to the views of FIGS. 2 and 3, but showing the hinge in accordance with a further embodiment of the present invention; and FIG. 6 is a view showing a section taken along the line 6—6 in FIG. 5.

DESCRIPTION OF THE PREFERRED EMBODIMENTS

Figure 3:
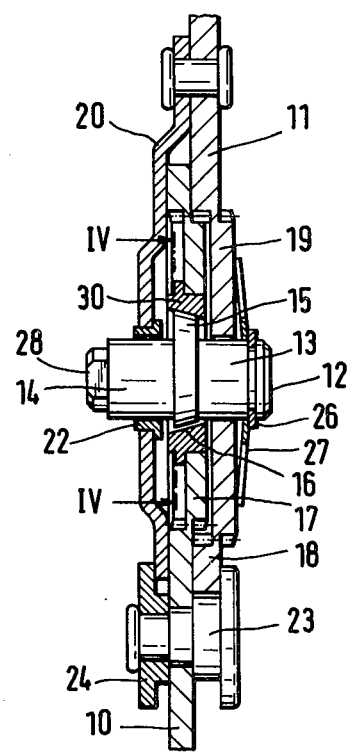
FIG. 3 is a view substantially corresponding to the view of FIG. 2 but showing the hinge in accordance with another embodiment of the invention.

A hinge according to the present invention is illustrated as a hinge unit for a power-vehicle seat assembly. The hinge in accordance with the present invention has a fixed hinge part 10 associated with a seat member of a power-vehicle seat, and a pivotable hinge part 11 which is mounted on a back thereof. The hinge parts 10 and 11 are pivotally connected by a shaft 12 which defines their pivot axis. The shaft 12 has two central portions 13 and 14 and a portion located therebetween and formed as an eccentric 15. The eccentric in the hinges of the embodiments shown in FIGS. 1, 2 and FIG. 3 is formed as a truncated cone which is surrounded by a conical bore 16 having the inclination corresponding to the inclination of the truncated cone. The conical bore 16 is provided, for example, in a spur gear 17 of the fixed hinge part 10.

The gear 17 includes a wall disk which is of one piece with the hinge part 10 and is manufactured, for example, by extrusion. The conical bore 16 is arranged in the central region of the wall disk concentric to the toothing. The inclination of the conical bore 16 corresponds to the inclination of the eccentric 15, and its diameter in insignificantly greater than the diameter of the truncated cone 15 of the eccentric. The pivotable hinge part 11 has an inner toothed rim 18 with a head circle diameter which is greater than the head circle diameter of the gear 17 by at least one tooth height. Also, the number of teeth of the inner toothed rim 18 is greater than the number of teeth of the gear 17 by at least one tooth. The inner tooth rim 18 of the hinge part 11 is bridged by a wall disk 19 which is of one piece therewith. The wall disk 19 is supported on the central portion 13 of the shaft 12 concentrically to the inner toothed rim 18.

An end plate 20 is connected with the pivotable hinge part 11, for example by a rivet 21. The end plate 20 overlaps the hinge part 10 in the region of the gear 17, confines the gear 17 between itself and the wall disk 19 of the hinge part 11, and is supported on the central portion 14 of the shaft 12 with the aid of a sliding bush 22. For axial assembling of the hinge part, there are further provided a pin 23 provided in the hinge part 10 in the region opposite to the rivet 21 and associated with a bush 24. The head of the pin 23 partially overlaps the hinge part 11 and the collar of the bush 24 of the end plate 20.

The central portion 14 extending beyond the end plate 20 has at its end an annular groove 25 with a safety ring 26 received therein. A spring disk 27 forming an accumulator abuts against the safety ring 26, on the one hand, and abuts against the end plate 20, on the other hand. A non-round pin 28 extends from the end face of the central portion 14, the end face being adjacent to the annular groove 25. A handwheel 29 shown in dash-dot lines is mounted on the pin 28.

In the embodiment shown in FIG. 2, the truncated cone forming the eccentric 15 and the conical bore 6 surrounding the same are inclined toward the pin 28. During driving the shaft 12 into rotary movement, the static friction force at the supporting location of the shaft, which supports the action of the spring disk 25, reduces, so that the axial force resulting from the radial force acting upon the eccentric 15 is greater than the force of the spring disk 27 and the sliding friction force supporting the same. Thereby, the shaft 12 together with its eccentric 15 moves to the right from the fixation position shown in FIG. 2 and facilitates the adjustment movement. The inclination of the eccentric 15 is selected so that the static friction angle is in the self-locking range.

The hinge shown in FIG. 3 has several differences as compared with the hinge of FIG. 2. One of these differences is that the conical bore 16 is provided in a bush 30 which is inserted into the gear 17 for joint rotation therewith. This makes possible to provide for a required friction value in the event of utilization of different materials, and to attain by respective width selection of the bush 30 an abutment between the eccentric 15 and the conical bore 16 over the entire surface both in the supporting condition and in the movement condition. A further difference of the hinge of FIG. 3 resides in the fact that the conical bore 16 and the truncated cone which forms the eccentric 15 are reduced in direction toward the wall disk 19 of the inner toothed rim 18. Thereby the end plate 20 is free from the action of axial force, inasmuch as the latter is taken up directly by the hinge part 11.

It is to be understood that in the hinge shown in FIG. 3 the spring disk 27 which forms the accumulator is supported at its one end on the central portion 13 or in some cases via the safety ring 26 arranged in the annular groove 25. The other end of the spring disk 27 abuts against the wall disk 19 of the hinge part 11. The force conditions during the adjustment movement and the immovable position of the hinge shown in FIG. 3 are analogous to the force conditions of the hinge shown in FIG. 2.

Figure 4:
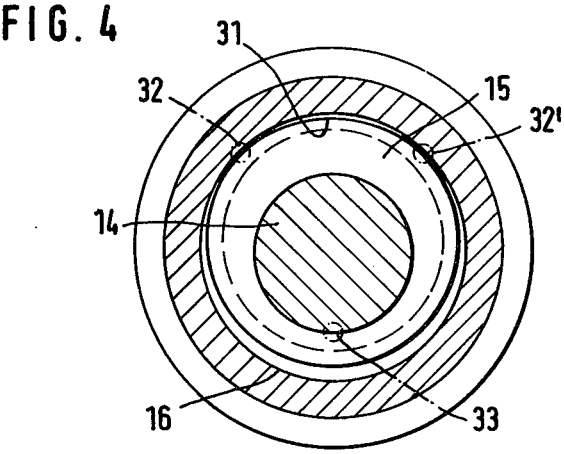
FIG. 4 is a view showing a section taken along the line 4—4 in FIG. 3.

For obtaining a safety support position of the spur gear on the shaft member, a conical surface portion 31 of the eccentric 15 in the region of the greatest eccentricity is provided with a smaller curvature than a remaining conical surface of the truncated cone which forms the eccentric 15. This is shown in FIG. 4. Position points 32 and 32' are thereby produced at both sides of the longitudinal central plane of the shaft, between the flatter conical surface portion 31 and the remaining conical surface. They form, together with lower side lines 33 on the central portions 13 and 14 of the shaft member 12, a three-point support. The flattened conical surface portion 31 extends over a distance substantially corresponding to 90°.

As mentioned above, the illustrated embodiments of the invention are only exemplary and not limiting in any case. Other embodiments and constructions of the hinge in accordance with the present invention are possible. Thus, for example, it is advantageous to arrange the conical bore in the wall disk 19 and to place the eccentric 15 on the shaft so that the eccentric engages in the conical bore in the wall disk 19. Moreover, the application of such a hinge is not limited to power-vehicle seats, but this hinge can be generally utilized in the event when the radial play is to be eliminated. In keeping with these objects, the hinge can be utilized not only in vehicle seats, but also in window panes, head supports, and the like. Furthermore, this hinge can be utilized for such seats in which the backs can be pivoted, for example, for lifting and lowering the backs in two-door passenger cars so as to make accessible the rear space.

The hinge for the latter mentioned application is illustrated in FIGS. 5 and 6. In this hinge, the gear 17 is formed as a separate structural element which is releasably connected with the fixed hinge part 10. The gear 17 has a rim projecting outwardly of the tooth plane and provided with two projections 34 and 35 at its periphery, spaced from one another. The lower projection 34 process against a pin 36 connected with the hinge part 10. A locking lever 38 which is pivotally mounted on the hinge part 10 and retained in position by a pulling spring 37 lies on the upper projection 35 of the gear 17.

As long as the locking lever 38 is retained in its position shown in FIG. 5, the gear 17 is connected with the hinge part 10 for joint rotation therewith. The hinge part 10 has in its hinge ear a projection 39 arranged centrally to the eccentric 15 and surrounding the eccentric with play. The projection 39 is rotatably supported in an insert ring 40. The insert ring 40 has an outer toothing which corresponds in its dimensions and shape to the inner toothing of the gear 17 complementary to the outer toothing of the gear, and engages in the same. The gear 17 during releasing of the locking lever 38, rotatably supports on the projection 39 of the hinge part 10 via the insert ring 40 which reduces the surface pressure.

For forward turning of the back, the locking lever 38 is connected via a pulling rope 41 with a not shown actuating member arranged in the upper region of the back. With the aid of this actuating member, the locking lever 38 can be turned back against the force of the spring 37 from the abutment 35 so that the back is turned forwardly. The engagement of the gear 17 in the inner toothed rim 18 of the hinge part 11 associated with the back via the eccentric 15, so that after the return movement of the back it can assume its adjusted inclined position.

It will be understood that each of the elements described above, or two or more together, may also find a useful application in other types of constructions differing from the types described above.

While the invention has been illustrated and described as embodied in a hinge, particularly for a seat having a back, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hinge, particularly for a seat with an adjustable back, comprising two hinge parts movable relative to one another about a pivot axis between a plurality of relative positions: a rotatable shaft member defining said pivot axis; and means for adjusting the relative position between said hinge parts and formed as a transmission, said adjusting means including an eccentric arranged on said shaft member for joint rotation therewith and having an inclined surface, a first gear associated with one of said hinge parts, and a second gear associated with the other of said hinge parts and engaging with said first gear, said first gear being provided with a bearing engaging with said surface of said eccentric, said shaft member together with said eccentric being displaceable in an axial direction with the aid of an accumulator for obtaining a radial displacement between said hinge parts, said eccentric being formed as a truncated cone having a predetermined inclination, and said bearing having a conical bore, with an inclination corresponding to the inclination of said truncated cone of said eccentric and having a somewhat greater diameter than the latter, said truncated cone of said eccentric and said conical bore of said bearing forming a bearing pair having predetermined static friction angle and sliding friction angle, said inclination having an angle which is smaller than said static friction angle and greater than said sliding friction angle of said bearing pair, and the relative position of said hinge parts being adjustable by a user by only rotating said shaft member with said eccentric.

2. A hinge as defined in claim 1, wherein one of said gears is an inner gear, the other of said gears being arranged to roll over said inner gear, said bearing being formed as a bush which is provided with said conical bore and fixedly connected with said other gear.

3. A hinge as defined in claim 2, wherein said inner gear has a wall disk, said conical bore having a cross section which reduces in an axial direction toward said wall disk.

4. A hinge as defined in claim 1, wherein said eccentric has a surface region of a greatest eccentricity and its surface in said region has a smaller curvature than in a remaining region.

5. A hinge as defined in claim 4, wherein said eccentric has transition points located between said first-mentioned region and said remaining region and spaced from one another by a distance corresponding to an angle of 90°.

* * * * *